Aug. 22, 1950 — H. A. CONNER — 2,519,888
RAILROAD CAR BRAKE
Filed May 3, 1948 — 2 Sheets-Sheet 1

Inventor
HAROLD A. CONNER
by The Firm of Charles H. Wills
Attys.

Aug. 22, 1950 H. A. CONNER 2,519,888
RAILROAD CAR BRAKE

Filed May 3, 1948 2 Sheets-Sheet 2

Inventor
HAROLD A. CONNER

Patented Aug. 22, 1950

2,519,888

UNITED STATES PATENT OFFICE 2,519,888

RAILROAD CAR BRAKE

Harold A. Conner, Aurora, Ill.

Application May 3, 1948, Serial No. 24,799

2 Claims. (Cl. 188—41)

This invention relates to improvements in a brake mechanism for a railroad car. More particularly, this invention has to do with railroad car brakes which are adapted to be applied directly to the rail by a vertical thrust from the truck.

At present it is the practice to apply brakes to a railroad car through the traction wheels. With the advent of high speed railroad trains, flat spots quite frequently develop on the wheels, resulting in rough, uneven riding characteristics and excessive pounding on the rails. These considerations have accentuated the desirability of applying a braking effort through mechanism other than the wheels.

It is accordingly an object of this invention to provide a braking mechanism mounted on the railroad car removed from the wheels and movable directly into contact with the railroad tracks for applying a braking force for stopping the car.

Another object of this invention is to provide a novel spring loaded mechanism for retracting the brake assembly after the brakes have been applied.

A further object of this invention is to provide novel door means for preventing dirt, stones and the like from contacting the braking mechanism while the car is moving.

According to the general features of this invention there is provided a brake assembly on each side of the truck of a railway car comprising a plunger extending downwardly between the front and rear wheels, to which plunger is affixed a horizontal brake shoe made of any suitable braking material and arranged to contact the track upon downward movement of the plunger.

A special feature of this invention is the provision of an enclosing housing for the brake mechanism which has a door swingable downwardly to an open position to permit downward passage of the brake mechanism therethrough, said door being automatically returned to its closed position as said plunger is retracted for preventing dirt or stones or the like from entering the braking mechanism during the operation of the train.

Other and further features, objects and advantages of the present invention will be apparent to one skilled in the art from the following description taken in connection with the annexed drawings.

Figure 1:
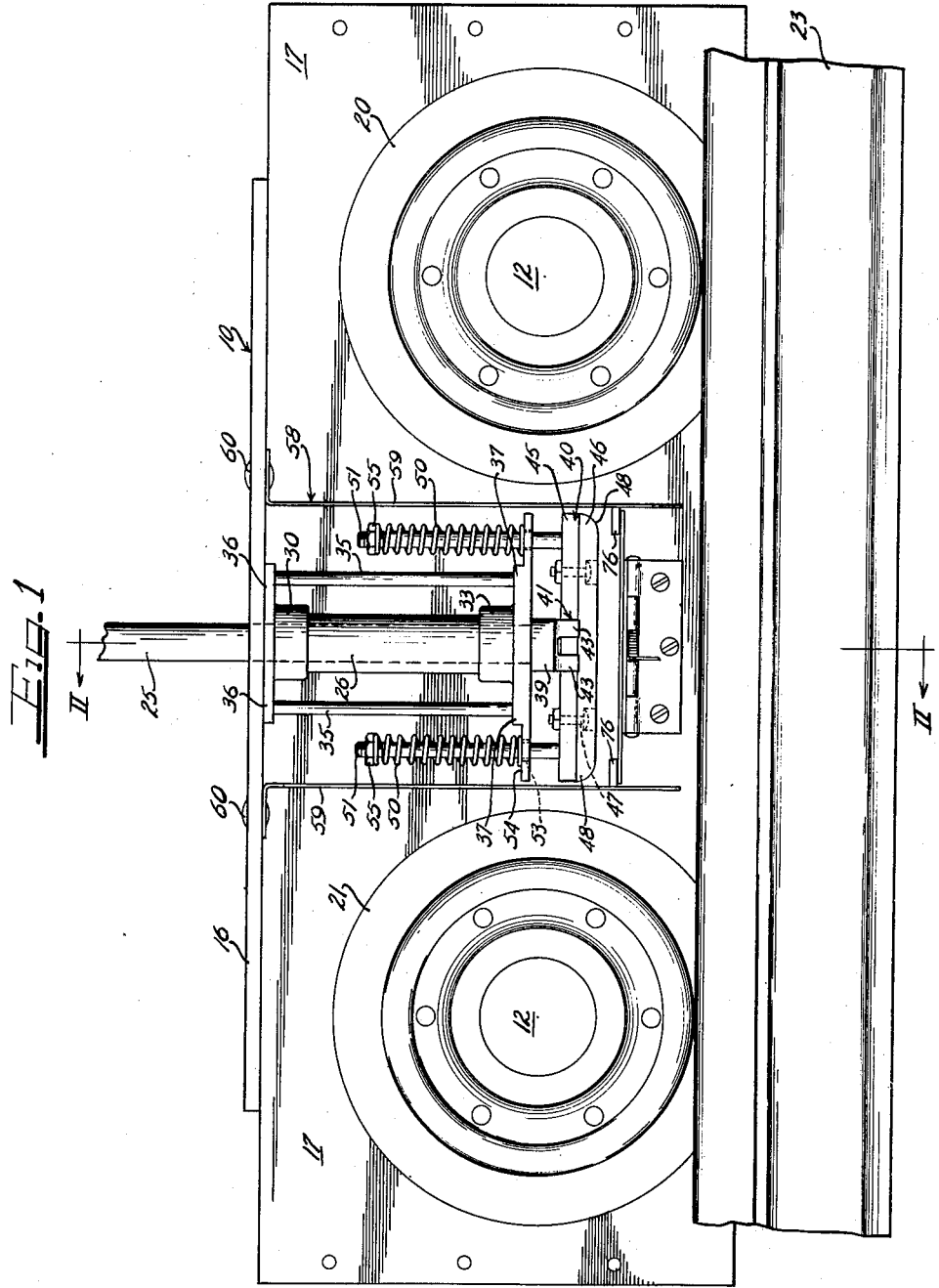
Figure 1 is a side elevational view of the braking mechanism of this invention as applied to the truck of a railroad car, with the brake-enclosing side plate removed.

The reference numeral 10 indicates generally the truck of a railroad car and includes a horizontal structural member 11, vertical structural members 13 and 14, and an axle 12 rotatably mounted in the frame structure. It will be understood that the box-like structure defined by the structural members 11, 13 and 14 is representative of the structural frame work which makes up the body of a railway car truck and on which is supported functional members, such as the horizontal plate 16 and the vertical side plate 17 which extend substantially the entire length of the truck. The plates 16 and 17 may be secured to the frame structure by any suitable means, as by welding.

A front wheel 20 and a rear wheel 21 are disposed in spaced relation on each side of the truck, suitably secured to the axle 12 and arranged to roll over a track 23.

The braking mechanism of this invention includes a rod or plunger 25 slidably mounted in a guide tube 26 in upper and lower cylindrical bushings 27 and 28, respectively. The plunger 25 may be operated by any suitable means such, for example, as air or hydraulic pressure or even through a series of levers. The bushing 27 is held in a recess 29 at the end of the guide tube 26 by means of a collar 30 which is suitably secured thereto, as by welding. At the other end the bushing 28 is held in a recess 32 in the tube 26 by means of a collar 33 secured at that end of the tube.

To lend rigidity to the structure, a pair of support rods 35, Figure 1, are secured between laterally extending arms 36 of the collar 30 and similar arms 37 of the collar 33.

The plunger 25 is provided at its lower end with an enlarged cylindrical portion 39 which limits the upward movement of the rod by abutting contact with the underside of the collar 33. As a means of positioning a brake shoe assembly 40, there is attached to either side of the lower end of the cylindrical portion 39, and extending generally outwardly therefrom, a guide member 41 comprising a substantially horizontal arm 42 and two depending, finger members 43 which slant back toward the axis of the plunger 25.

Figure 2:
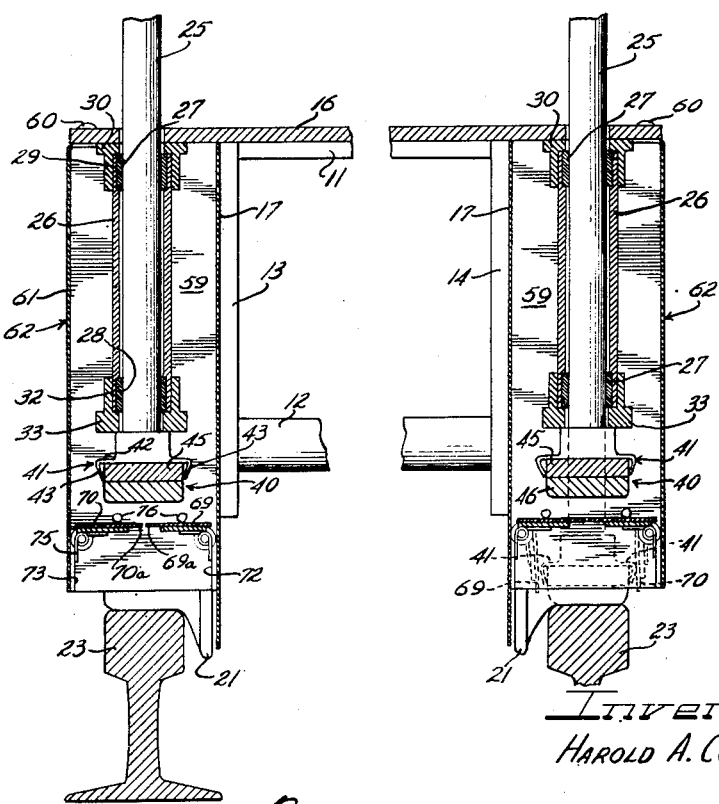
Figure 2 is a fragmentary vertical sectional view taken substantially on the line II—II of Figure 1, showing the operating, braking position of the brake mechanism in dotted lines.

As clearly shown in Figures 1 and 2, the brake shoe assembly 40 includes a backing plate 45 and a track-contacting plate 46 of any suitable braking material secured together as by countersunk bolts 47. The brake shoe assembly 40 may, of course, be made of a single plate, if a metal braking surface is to be used. The plate 46 may have rounded leading and trailing edges 48.

The brake shoe and plunger are returned to their upper, retracted position after the braking operation is completed by means of a pair of coil springs 50 disposed about rods 51 which are rigidly connected to and extend upwardly from the brake shoe assembly 40. One rod 51 is secured to either end of the shoe assembly 40 and is slidably disposed in an aperture 53 in the outer end of a plate 54 which is secured to or integrally formed with the collar member 33. The springs 50 are confined between the plate 54 and a lock nut 55 on the upper threaded end of the rod 51. In operation, as the brake shoe is moved downwardly by the rod 25, the springs 50 are compressed due to the downward movement of the rod 51. Then, when the pressure on the rod 25 is released, the springs will move the shoe into upper retracted position.

A special feature of this invention is the provision of a housing 58 disposed around the brake mechanism which shields the working surfaces from dirt and stones when it is in its inoperative, retracted position. It will be recognized that dirt and stones along the roadbed of a railroad can cause much damage to exposed parts of a fast moving train. The housing 58 comprises two wall members 59, one on either side of the brake mechanism, extending away from the side plate 17 to which it may be suitably secured as by welding. The wall members 59 may also be attached, as by rivets 60, to the top horizontal plate 16.

Figure 3:
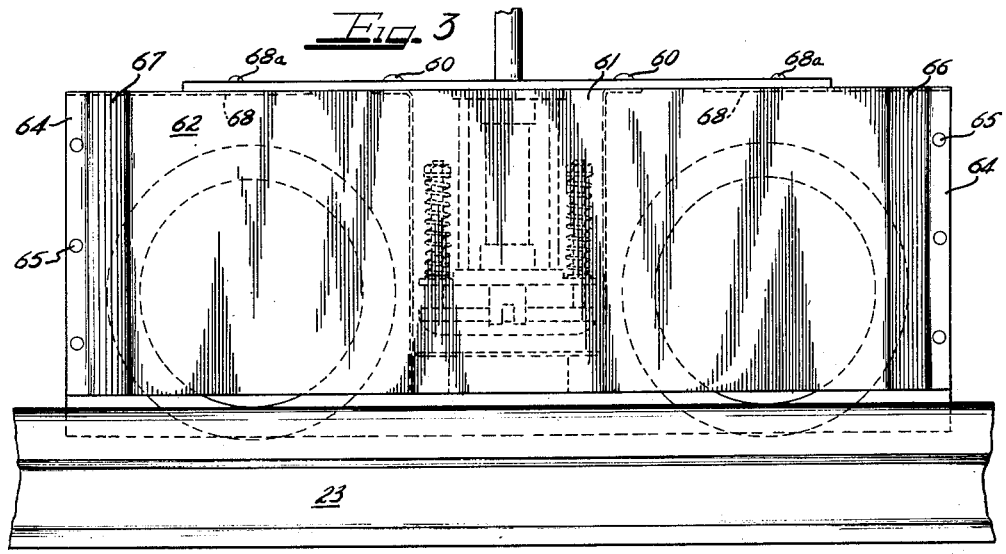
Figure 3 is a side elevational view similar to Figure 1, but showing the brake-enclosing side plate in position.

As shown in Figure 2, each wall member 59 extends away from the side plate 17 of the truck to a point outwardly of the braking assembly, where it abuts a longitudinal portion 61 of an outer side plate 62, Figure 3, which extends along the entire side of the truck, having flange portions 64 secured to the front and rear end of the side plate 17 by screws 65. It is to be noted that the side plate has a slanted forward portion 66 which forms a transition member between the outer side portion 61 and the relatively inner flange portion 64, thus providing a streamlined contour to the side plate 62. A similar slanted portion 67 connects the rear flange to the longitudinal outer portion 61 of the side plate 62. The side plate 62 also is provided at the forward and rearward portions thereof with a laterally extending flange 68 which is secured to the upper horizontal plate 16 as by rivets 68a.

It is thus seen that a chamber is formed between the wall members 59, the inner side plate 17 and the portion 61 of the outer side plate 62 with the horizontal plate 16 providing a cover for the chamber. Also, it is evident that the brake plunger and shoe is mounted for reciprocation in the chamber.

As a closure member for the bottom of the chamber there is provided a pair of doors 69 and 70 whose outer edges 69a and 70a, respectively, are arranged to move into a close confronting relation when the brake assembly is retracted, as shown in Figure 2. The door 69 is securely mounted on one leg of a hinge assembly 72, the other leg of which is suitably secured to the inner side plate 17. The door 70 is fastened to a hinge assembly 73 which has one leg secured to the outer side plate 62. Torsion springs 75 are disposed about the pivot end of each hinge assembly with the free end of the spring urging the door carrying leg members away from the fixed legs thereby moving the doors into closed position against stop pins 76 projecting from the wall members 59 as seen in Figure 1.

In Figure 2, brake assemblies are shown mounted on each side of the truck. At the left side, the brake assembly is shown in retracted position. At the right side the operating, braking position of the mechanism is shown in dotted lines. It will be noted that the brake shoe, on moving downward, has contacted the doors 69 and 70 and swung them downwardly to an open position. When the doors are in open position the guide members 41 hold them in a substantial vertical position against the action of the torsion spring 75. The hinged doors 69 and 70 are so located adjacent the lower end of the side plates 17 and 62, respectively, that they will not swing inwardly over the guide members 41 when the brakes are applied.

Thus, there is provided in this invention a housing having a pair of hinged doors which are opened by the brake shoe as it moves downwardly into braking position and which are automatically moved by spring action into their closed, dirt excluding position when the brake is retracted. It is, of course, obvious that a single door could be used instead of the dual door installation illustrated and described. It is also within the scope of this invention to provide a power mechanism for operating the doors in synchronism with the downward movement of the brake plunger. This could advantageously take the form of a fluid actuated power cylinder connected to the same fluid line which supplies power to the plunger 25 or, in the case of a lever-actuated plunger 25, the valve of the door-opening power cylinder could be controlled by movement of the linkage.

It will also be recognized that while there is disclosed in this application a brake shoe assembly disposed in a horizontal position at the lower end of the plunger, it is manifest that the shoe could be mounted on the rod in pivoting relation with the shoe arranged to adapt itself to slight variation in the contour of the track.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A braking mechanism for operation from the truck of a railway car comprising a housing mounted on the truck having an opening in the bottom wall thereof, a plunger slidably mounted in the truck, a brake shoe disposed directly beneath said plunger for downward movement therewith, spring means associated with said brake shoe for urging it into an upper retracted position, a guide member secured to the lower end of said plunger including guide arms partially encircling said shoe, and means for closing the opening in said housing including a hinged door mounted on said housing directly beneath said shoe, said guide arms being arranged to contact said door and hold it in an open position during the braking operation.

2. A braking mechanism for operation from a truck of a railway car, a support structure, a guide tube depending from said support structure and having laterally extending arms, a plunger slidably mounted in said guide tube, a brake shoe disposed at the lower end of said rod for downward movement therewith, rods extending upwardly from said brake shoe, springs mounted on said rods abutting the laterally extending arms of said guide tube for urging said brake shoe into upper retracted position, a housing enclosing said guide tube and said shoe and having an opening in the bottom wall, and means for closing said opening including a hinged door mounted on said housing directly below said brake shoe, said shoe contacting said door as it moves downwardly urging it into open position.

HAROLD A. CONNER.

REFERENCES CITED

The following references are of record in the file of this patent:

UNITED STATES PATENTS

| Number | Name | Date |
|---|---|---|
| 1,146,828 | White | July 20, 1915 |
| 1,273,212 | Freimark | July 23, 1918 |
| 1,865,798 | Reel | July 5, 1932 |
| 1,960,595 | Poe | May 29, 1934 |
| 2,110,865 | Burgess | Mar. 15, 1938 |